United States Patent
Syed et al.

(10) Patent No.: US 10,652,562 B2
(45) Date of Patent: May 12, 2020

(54) SYSTEM AND METHOD FOR SYNCHRONIZING TIMING ACROSS MULTIPLE STREAMS

(71) Applicant: Comcast Cable Communications, LLC, Philadelphia, PA (US)

(72) Inventors: Yasser F. Syed, La Crescenta, CA (US); Danial Holden, Greenwood Village, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 29 days.

(21) Appl. No.: 15/713,150

(22) Filed: Sep. 22, 2017

(65) Prior Publication Data

US 2018/0014025 A1    Jan. 11, 2018

Related U.S. Application Data

(60) Division of application No. 15/149,381, filed on May 9, 2016, now abandoned, which is a continuation of
(Continued)

(51) Int. Cl.
*H04N 19/40* (2014.01)
*H04N 21/234* (2011.01)
(Continued)

(52) U.S. Cl.
CPC .......... *H04N 19/40* (2014.11); *H04N 19/103* (2014.11); *H04N 19/184* (2014.11);
(Continued)

(58) Field of Classification Search
CPC .... H04N 19/40; H04N 19/184; H04N 19/103; H04N 21/23439; H04N 21/242; H04N 21/23424; H04N 19/156; H04N 19/115
See application file for complete search history.

(56) References Cited

U.S. PATENT DOCUMENTS 5,680,389 A     10/1997  Douglas et al.
5,847,760 A  *  12/1998  Elmaliach ............... H04N 19/15
                                                        348/390.1
(Continued)

FOREIGN PATENT DOCUMENTS

WO      02/097584 A2     12/2002
WO    2009053072 A1       4/2009
(Continued)

OTHER PUBLICATIONS

Oct. 12, 2018—Canadian Office Action—CA 2,798,843.
(Continued)

*Primary Examiner* — James M Pontius
(74) *Attorney, Agent, or Firm* — Banner & Witcoff, Ltd.

(57) ABSTRACT

Systems and methods of adaptive streaming are discussed. Transcoded copies of a source stream may be aligned with one another such that the independently specified portions of each transcoded stream occur at the same locations within the content. These transcoded copies may be produced by one or more transcoders, whose outputs are synchronized by a delay adjuster. A fragmenter may use the synchronized and aligned streams to efficiently produce fragments suitable for use in adaptive streaming.

20 Claims, 7 Drawing Sheets

Related U.S. Application Data application No. 13/326,563, filed on Dec. 15, 2011, now Pat. No. 9,380,327.

(51) Int. Cl.

| | |
|---|---|
| *H04N 21/242* | (2011.01) |
| *H04N 21/2343* | (2011.01) |
| *H04N 19/103* | (2014.01) |
| *H04N 19/184* | (2014.01) |
| *H04N 19/115* | (2014.01) |
| *H04N 19/156* | (2014.01) |

(52) U.S. Cl.
CPC . *H04N 21/23424* (2013.01); *H04N 21/23439* (2013.01); *H04N 21/242* (2013.01); *H04N 19/115* (2014.11); *H04N 19/156* (2014.11)

(56) References Cited

U.S. PATENT DOCUMENTS

| | | |
|---|---|---|
| 6,243,761 B1 | 6/2001 | Mogul et al. |
| 6,529,555 B1 | 3/2003 | Saunders et al. |
| 6,573,819 B1 | 6/2003 | Oshima et al. |
| 6,697,097 B1 | 2/2004 | Parker et al. |
| 6,724,825 B1 | 4/2004 | Nemiroff et al. |
| 6,885,703 B1 | 4/2005 | Funaya et al. |
| 6,888,477 B2 | 5/2005 | Lai et al. |
| 7,711,008 B2 | 5/2010 | Jones et al. |
| 8,458,362 B2 | 6/2013 | Holden et al. |
| 8,477,812 B2 | 7/2013 | Gurdan et al. |
| 8,594,136 B2 | 11/2013 | Cucchi et al. |
| 8,594,181 B2 | 11/2013 | Dachiku |
| 2001/0019585 A1 | 9/2001 | Lemaguet |
| 2002/0054638 A1 | 5/2002 | Hanamura et al. |
| 2002/0087976 A1 | 7/2002 | Kaplan et al. |
| 2003/0123556 A1 | 7/2003 | Komori |
| 2004/0111476 A1 | 6/2004 | Trossen et al. |
| 2004/0172385 A1 | 9/2004 | Dayal |
| 2007/0174880 A1 | 7/2007 | Fite et al. |
| 2007/0204003 A1 | 8/2007 | Abramson |
| 2007/0226365 A1 | 9/2007 | Hildreth et al. |
| 2008/0195743 A1 | 8/2008 | Brueck et al. |
| 2008/0200154 A1 | 8/2008 | Maharajh et al. |
| 2009/0010315 A1 | 1/2009 | Schedelbeck et al. |
| 2009/0113508 A1 | 4/2009 | Foti |
| 2009/0158365 A1 | 6/2009 | Gordon et al. |
| 2009/0232165 A1 | 9/2009 | Ishida et al. |
| 2009/0320082 A1 | 12/2009 | Collazo |
| 2010/0046604 A1 | 2/2010 | Elstermann |
| 2010/0091888 A1* | 4/2010 | Nemiroff ......... H04N 21/23655 375/240.28 |
| 2010/0138646 A1* | 6/2010 | Aloni ................ H04N 21/2343 713/150 |
| 2010/0158101 A1* | 6/2010 | Wu .................. H04N 21/23424 375/240.01 |
| 2010/0189131 A1 | 7/2010 | Branam et al. |
| 2010/0218231 A1 | 8/2010 | Frink et al. |
| 2010/0260262 A1 | 10/2010 | Coban et al. |
| 2010/0312828 A1 | 12/2010 | Besserglick et al. |
| 2011/0246616 A1* | 10/2011 | Ronca .............. H04N 21/26258 709/219 |
| 2011/0302236 A1 | 12/2011 | Shrum, Jr. et al. |
| 2012/0036277 A1 | 2/2012 | Stokking et al. |
| 2012/0084463 A1 | 4/2012 | Holden et al. |
| 2013/0044803 A1 | 2/2013 | Fisher et al. |
| 2013/0044840 A1 | 2/2013 | Yamamoto et al. |
| 2013/0156094 A1 | 6/2013 | Syed et al. |
| 2013/0297746 A1 | 11/2013 | Holden et al. |

FOREIGN PATENT DOCUMENTS

| | | |
|---|---|---|
| WO | 2010106075 A1 | 9/2010 |
| WO | 2011/142113 A1 | 11/2011 |

OTHER PUBLICATIONS

"Using a Manifest XML File to Convey SCTE 35 Messaging Information Through the Use of an Alternative Video/Audio View Mechanism", IP.com Journal, IP.com Inc., West Henrietta, NY, US, Sep. 28, 2010 (Sep. 28, 2010), XP013140572, ISSN: 1533-0001.

Extended European Search Report—EP 12197203.8—dated Apr. 4, 2013.

European Office Action, EP Application 12 197 203.8-1908, dated Jan. 21, 2015.

Alex Zambelli: "IIS Smooth Streaming Technical Overview", Internet Citation, Mar. 25, 2009 (Mar. 25, 2009), pp. 1-18, XP002620446, Retrieved from the Internet: URL:http://www.microsoft.com/downloads/en/details.aspx?FamilyID=03d22583-3ed6-44da-8464-b1b4b5ca7520 [retrieved on Jan. 21, 2011].

"OIPF Release 2 Specification HTTP Adaptive Streaming [V2.0]—[Sep. 7, 2010]", Sep. 7, 2010 (Sep. 7, 2010), XP055009601, Retrieved from the Internet: URL:http://www.oipf.tv/live/oipf/docs/Release2/OIPF-T1-R2-specification-Volume-2a-HTTP-Adaptive-Streaming-V2 0-2010-09-07.pdf [retrieved on Oct. 14, 2011].

Gerard Fernando et al: "HTTP Streaming of MPEG Media—Response to CfP", 93. MPEG Meeting; Jul. 26, 2011-Jul. 30, 2010; Geneva; (Motion Picture Expert Group or ISO/IEC JTC1/SC29/WG11), No. M17756, Jul. 22, 2010 (Jul. 22, 2010), XP030046346.

Extended European Search Report—EP 11181773—dated Feb. 4, 2013.

Response to European Office Action—EP 12197203.8—dated Jul. 14, 2015.

Jan. 23, 2019—Canadian Office Action—CA 2,753,243.

U.S. Pat. No. 8,458,362, Delivering Content in Multiple Formats, filed Sep. 30, 2010.

U.S. Pat. No. 9,380,327, System and Method for Synchronizing Timing Across Multiple Streams, filed Dec. 15, 2011.

U.S. Pat. No. 9,596,283, Delivering Content in Multiple Formats, filed Apr. 29, 2013.

U.S. Appl. No. 15/149,381, System and Method for Synchronizing Timing Across Multiple Streams, filed May 9, 2016.

U.S. Appl. No. 15/421,778, Delivering Content in Multiple Formats, filed Feb. 1, 2017.

* cited by examiner

SYSTEM AND METHOD FOR SYNCHRONIZING TIMING ACROSS MULTIPLE STREAMS

CROSS-REFERENCE TO RELATED APPLICATIONS

This application is a divisional of U.S. application Ser. No. 15/149,381, filed May 9, 2016, which is a continuation of U.S. application Ser. No. 13/326,563, filed Dec. 15, 2011, issued as U.S. Pat. No. 9,380,327 on Jun. 28, 2016, the contents of which are hereby incorporated by reference in their entirety.

BACKGROUND

Video content may be transmitted over links with unknown or variable bandwidth characteristics. To accommodate the different bandwidths that may be available, the video content may be offered in several formats, each with different bandwidth requirements. If the quality of a communication link degrades during delivery such that the selected format is no longer supported, a server may stop transmitting the selected format and select a format with lower-bandwidth requirements for transmission. Varying the format of a video stream over time is known as adaptive streaming. A need exists for systems and methods that enable adaptive streaming that are modular, scalable, and efficient.

SUMMARY

Some aspects of the disclosure relate to methods and systems that may facilitate adaptive streaming. According to one aspect of the disclosure, a content stream may be sent to one or more transcoders for transcoding into several different formats.

According to another aspect of the disclosure, the outputs of one or more transcoders may be sent to a delay adjusting device, which synchronizes the outputs of the transcoders.

According to a further aspect of the disclosure, the output of a delay adjusting device may be sent to a fragmenter, which packages transcoded streams into fragments. The fragments may be independently specified. This enables any one fragment to be followed by any other fragment, which may be used, for example, to facilitate adaptive streaming. Each fragment may be indexed and stored for immediate or later access in the same format as it is received. Alternatively, each fragment may be formatted into a packet, such as an internet protocol (IP) packet, to facilitate either immediate transmission or later transmission.

According to yet another aspect of the disclosure, a fragmenter may rely on its inputs being synchronized and aligned. This may allow a fragmenter to produce fragments that are independently specified without examining the content of some or all of the inputs. For example, a fragmenter may examine the content of one input to identify when its fragments should begin and end. The fragmenter may use these beginning and ending points to begin and end the fragments of the other inputs that are aligned and synchronized with the input that was examined. Similarly, where the fragmenter receives an indication of where independently specified portions begin and end, the indication may be used to begin and end the fragments of other inputs that are synchronized and aligned.

The preceding presents a simplified summary in order to provide a basic understanding of some aspects of the disclosure. The summary is not an extensive overview of the disclosure. It is intended neither to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
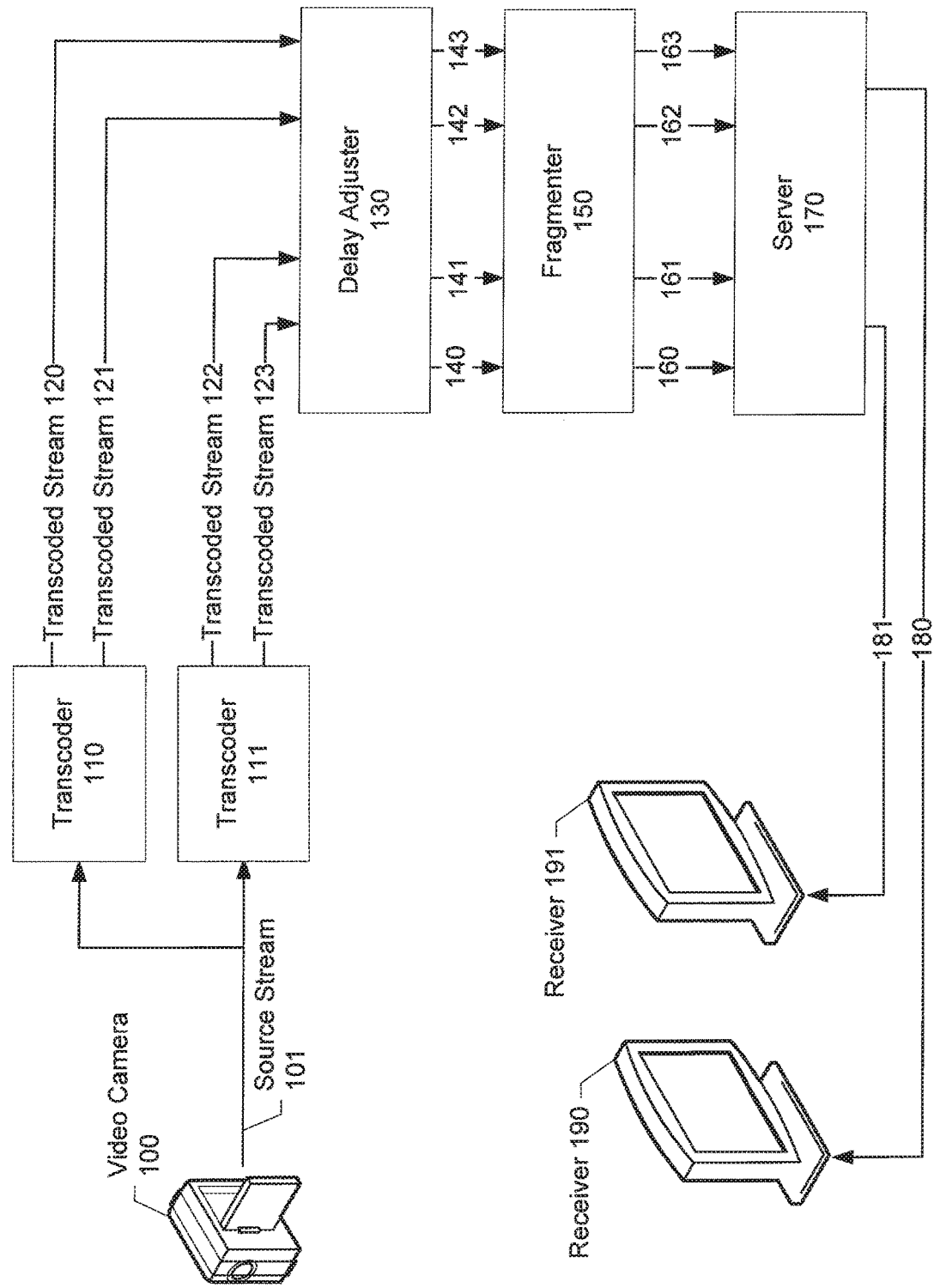
FIG. 1 illustrates an example of a system that allows adaptive streaming to occur.

FIG. 1 illustrates an example of a system for adaptive streaming. In the example of FIG. 1, there is shown a source stream 101, which comes from a source 100. The source 100 may be any type of source, such as a database or a capture device such as a camera. In one aspect, content source 100 may send or make available a feed to an encoder that outputs source stream 101 in real-time. The encoder may be, for example, a mezzanine encoder, which is an encoder whose output is of very high quality. In still further examples, source stream 101 may be created by reading a saved file. Source stream 101 may be of any quality level, but high quality encoding, such as mezzanine-level encoding, generally allows for higher quality output streams. The source stream may represent any of a variety of media types, such as, for example, data, an audio stream, a video stream, an audio and video stream (e.g., a movie or television show), an interactive commercial, television, or game feed, a song, or any other content stream. Additionally, the source stream may originate from any device, such as a video camera, audio recorder, computer server, or any other type of device capable of generating a data stream.

Source stream 101 may be is received by transcoders 110 and 111. Transcoders 110 and 111 may be implemented in one or more computing devices. In some embodiments, the computing device may have special purpose software and/or hardware, such as hardware to aid in the transcoding. In other embodiments transcoders may be implemented in a general purpose computing device. Transcoder 110 may take source stream 101 and generate transcoded streams 120 and 121. Transcoder 111 make take source stream 101 and generate transcoded streams 122 and 123 carrying a common piece of content (e.g., the same video program) but encoded differently. Each of the transcoded streams may transcode, e.g., compress source stream 101 by a different amount. For example, source stream 101 may be encoded at an average bit rate of 40 Mbps; transcoded stream 120 may be encoded at an average bit rate of 10 Mbps; transcoded stream 121 may be encoded at an average bit rate of 5 Mbps; transcoded stream 122 may be encoded at an average bit rate of 2.5 Mbps; and transcoded stream 123 may be encoded at an average bit rate of 1.2 Mbps.

More or fewer transcoders may be used. For example, a third transcoder may receive source stream 101 and use it to generate additional transcoded streams. Similarly, each transcoder may produce more of fewer transcoded streams than then number shown in FIG. 1. For example, transcoder 110 may produce five transcoded streams, and transcoder 111 may produce eight transcoded streams.

The transcoders may take a different amount of time to produce each of the transcoded streams. For example, transcoded stream 120 may take 10 ms to produce, but transcoded stream 121 may take only 6 ms to produce. In this example, transcoded stream 120 is 4 ms behind transcoded stream 121. This 4 ms difference may occur because stream 121 is transcoded using a different profile than stream 120. For example, stream 121 may be a 5 Mbps stream whereas stream 120 may be a 10 Mbps stream. Even if transcoder 110 produces transcoded streams 120 and 121 in the same amount of time, the transcoded streams still may not be synchronized because transcoder 111 may produce transcoded streams 122 and/or 123 in a different amount of time than transcoder 110 takes to produce transcoded streams 120 and 121. This difference may exist due to, for example, differing manufacturer or hardware specifications between transcoder 110 and transcoder 111. Differing transcoding profiles among the transcoded streams may also cause the transcoded streams to be output at different times. The process of transcoding streams will be described in more detail below with reference to FIG. 3.

Each of the transcoded streams may be forwarded to a delay adjuster computing device 130. Delay adjuster 130 may synchronize the transcoded streams 120-123. In the example given above, transcoded stream 120 was 4 ms behind transcoded stream 121. Delay adjuster 130 delays transcoded stream 121 by 4 ms more than it delays transcoded stream 120, resulting in transcoded streams 120 and 121 being synchronized. The synchronized versions of transcoded streams 120-123 are represented by streams 140-143, respectively, in FIG. 1. The process of synchronizing the transcoded streams will be described in more detail below with reference to FIGS. 4, 5, and 6. In some embodiments, source stream 101 may also be forwarded to delay adjuster 130 and synchronized with streams 140-143.

Synchronized streams 140-143 may be received by fragmenter 150 and output in fragmented form as streams 160-163. Fragmenter 150 may package each stream into a series of fragments that are appropriate for use in adaptive streaming playback. For example, each fragment of a video stream created by fragmenter 150 may be playable without requiring information from any frames that are outside the fragment. This allows a fragment from one stream to be followed by a fragment from any of the other synchronized streams. For example, a fragment from stream 160 may be followed by the next fragment from stream 160, but it may also be followed by a fragment from stream 161, 162, 163, or even by a fragment from another stream. The process of fragmenting incoming streams will be described in more detail below.

Fragmented streams 160-163 may be forwarded to a computing device such as server 170. Server 170 may be, for example, a node in a content distribution network, such as a video on demand server. Server 170 may also be, for example, a switched digital video server or any other server that forwards content to a receiver. As seen in FIG. 1, server 170 may forward stream 180 to receiver 190 and stream 181 to receiver 191. Each of streams 180 and 181 may be comprised of any combination of fragments from streams 160-163. For example, stream 180 may begin with fragments from stream 160, which is encoded at 10 Mbps, but fragments from stream 161, which is encoded at 5 Mbps, may follow due to, for example, network congestion between server 170 and receiver 190 that may inhibit smooth playback of additional 10 Mbps fragments. An example of how server 170 may determine which fragments to forward to a receiver is discussed below with reference to FIG. 2.

Devices 190 and/or 191 may be any computing device that receives a content stream. Such a device may have dedicated software and/or hardware for playing, outputting, or otherwise processing a content stream. For example, a devices 190/191 ("receiver") may be a television, tablet computer, a personal computer, a smartphone, a digital video (and/or audio) recorder, a terminal, such as a "set top box," etc. A receiver may have a display that shows video content from the received streams. In some embodiments, one or more receivers will send information about playback and/or network performance to server 170. They may do this automatically or in response to a query from server 170. The information server 170 receives from a receiver may be used to adjust which fragments server 170 will include in the stream being sent to that receiver. Alternatively, or in addition, server 170 may gather network performance data from other sources, such as probes located between server 170 and one or more of the receivers.

Figure 2:
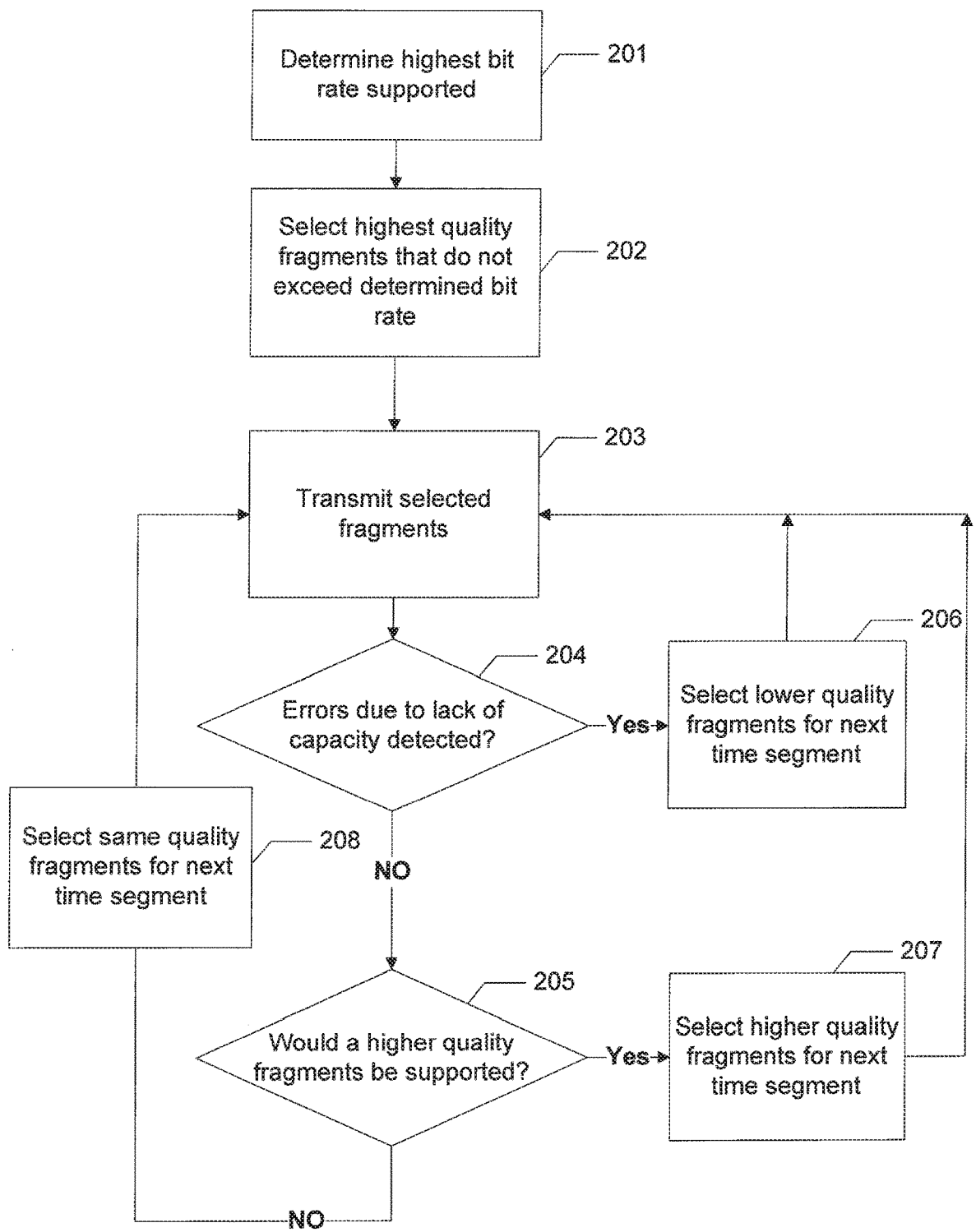
FIG. 2 illustrates an example method for selecting fragments during adaptive streaming.

FIG. 2 illustrates an example of how a computing device, such as server 170, may select which fragments to transmit to a receiver. In step 201, the highest supported or allocated bit rate is identified. This may be the highest bit rate supported or allocated by the communication channel or link between server 170 and a receiver, such as receiver 190. For example, if a receiver has an allocated bandwidth of 10 Mbps, this allocation may be identified in step 201. Alternatively, the current capacity of the communication or network link may be determined. For example, data may be transmitted and the rate at which acknowledgements of the data's receipt are received may be measured to identify the actual bandwidth available. In addition to considering the link, the capabilities of the receiver, the equipment connected thereto, and/or a user's subscription plan or status may also be considered in step 201. For example, high definition content may not be transmitted to a receiver that cannot process and/or display such content. Similarly, high definition content may not be transmitted to receivers associated with users in a lower tier of service.

In step 202, the highest quality fragments that do not exceed the maximum supported bitrate or capacity determined in step 201 may be selected for initial transmission. Using fragmented streams 160-163 from FIG. 1 as an example, the fragments of 5 Mpbs stream 161 would be selected if the capacity determined in step 201 were 7 Mbps. The fragments of stream 160 would not be selected because they are encoded at 10 Mbps, which exceeds the 7 Mbps capacity. The fragments of streams 162 and 163, which are encoded at 2.5 Mbps and 1.2 Mbps, respectively, would not be selected because the fragments of stream 161 are encoded at a higher bitrate than the fragments of streams 162 and 163 but do not exceed the 7 Mbps capacity.

In step 203, the selected fragments may be transmitted. For example, server 170 may transmit the selected fragments to receiver 190. The fragments may be transmitted using a variety of protocols, including, for example, an internet data streaming protocol. Instead of identifying the highest quality fragments supported by the link prior to step 203, as was done in steps 201 and 202, the process may start by sending fragments of a random or predetermined bitrate.

In step 204, a device such as the receiver and/or server 170 may determine if errors due to lack of capacity are occurring. An error threshold may be established to require that a particular error condition (e.g., capacity dropping below a required minimum level) remain for a predetermined amount of time (e.g., 500 ms) before it is considered to be an error, in order to avoid lowering the quality of the transmitted fragments due to momentary interference. An error due to lack of capacity may be a lack of bandwidth. It may also be an inability of a receiver to process the currently selected fragments. If a lack of capacity is detected, fragments of lower quality than the currently-selected fragments may be selected for transmission in the next time segment in step 206. The next time segment may be of any length of time, and it may be a set number of fragments that does not necessarily correlate to a preset amount of time. For example, the number of fragments needed to compose 5 seconds of content may be selected in step 206. Alternatively, a set number of fragments, such as one fragment or ten fragments, may be selected in step 206. The lower quality fragments selected in step 206 may be of the next lower quality level available. Alternatively, if the link speed has been determined, the quality level of the fragments may be selected based on the bit rate that the link can currently support, similar to step 202, above.

If it is determined in step 205 that higher quality fragments would be supported, then higher quality fragments are selected for transmission in the next time segment in step 207. Whether higher quality fragments would be supported may be determined by measuring the link speed and/or the capabilities of the receiver. It may also be determined by measuring the current error rate. (If there are no or very few errors, then higher quality fragments may be used.) As with step 206, the next higher quality level above the quality level of the currently selected fragments may be selected. Alternatively, the fragments may be selected based on the bit rate supported by the link. A delay may be built into the process to avoid unnecessarily changing which quality level of fragments is selected. In other words, the answer to step 204 or 205 may always be "no" unless a certain amount of time has passed. In some embodiments, this delay may apply to increasing the quality of the selected fragments, but not to decreasing the quality of the selected fragments.

If errors due to a lack of capacity are not detected and higher quality fragments than the currently selected fragments would not be supported, as determined in steps 204 and 205, then fragments of the same quality as the currently selected fragments are selected for transmission in the next time segment in step 208.

In steps 206 and 207, if higher or lower quality fragments are not available, then the current selection of fragments may be maintained. In the case where the lowest quality fragments experience too many errors, the transmission may cease.

The bitrate of the fragments used to transmit content to, for example, a single receiver may change over time, as described with reference to FIG. 2, and it may be desirable to deliver the content such that the changes in the bitrate are not noticeable to a user. To facilitate this, it may be desirable for the transcoders to encode the transcoded streams such that switching between the streams does not require retransmission of portions of the content that were already transmitted, e.g., in another format. This may be achieved by aligning the transcoded streams as described below.

Using video content as an example, many video codecs organize compressed video into i-frames, b-frames, and p-frames. An i-frame, also known as an intra-coded frame, is a fully specified picture for a frame of video, where the decoder can reconstitute the frame of video using just the information in the i-frame, and without referencing information for any other frames. A p-frame, also known as a predicted frame, contains only information identifying the changes in the image from a previous frame or frames. A decoder handling a p-frame will need to consult information from the previous frame or frames in order to reconstitute the frame of video. Using a p-frame instead of an i-frame may save space, resulting in a more compressed video stream. A b-frame, also known as a bi-predictive frame, may be even more compressible, as it contains only information identifying changes in the image from previous frame(s) and from subsequent frame(s).

A source video stream may be transcoded to multiple different streams such that any one of the transcoded streams may be switched with any other of the transcoded streams without re-transmitting any frames. This may be accomplished, in one aspect, by encoding the streams such that: (1) an i-frame is located immediately after each switching point; (2) any b-frames or p-frames after a switching point do not reference any frame located before the switching point; and (3) any p-frames before a switching point do not reference any frames located after the switching point. Such conditions ensure that the streams can be switched between without re-transmission of frames because the portions of each stream that are located between switching points are independently specified. In other words, each of these portions can be played without any information from another portion of the stream.

Figure 3:
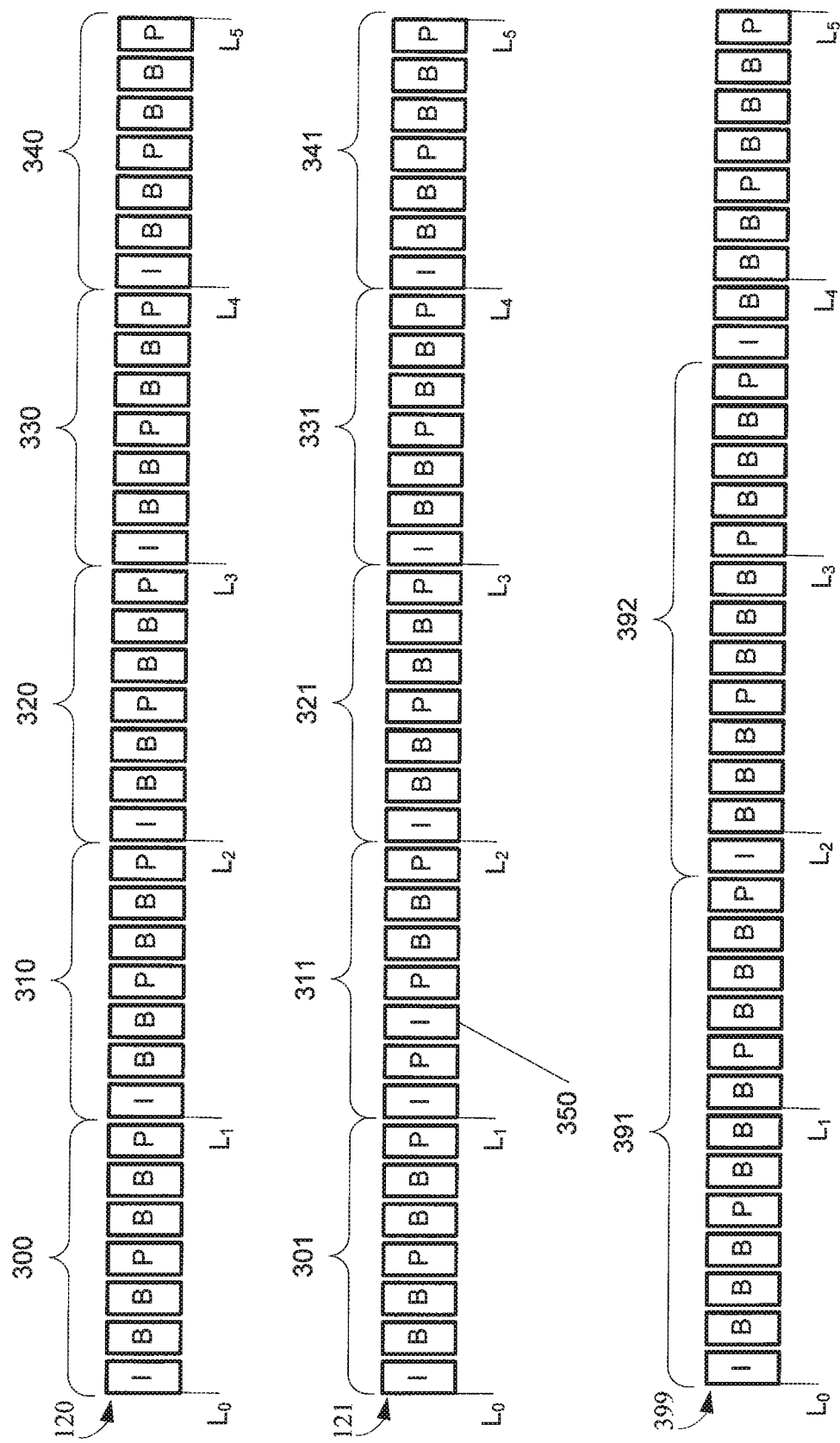
FIG. 3 illustrates an example of two video streams that are aligned and one video stream that is not aligned.

FIG. 3 illustrates an example of two streams of frames, labeled 120 and 121, in which the locations of the i-frames are aligned (e.g., the streams are encoded such that video frames at common locations within each stream of the program are both encoded as i-frames). Both streams 120 and 121 have i-frames every seventh frame, as seen at locations $L_0$, $L_1$, $L_2$, $L_3$, and $L_4$. Locations $L_0$-$L_5$ are locations within the source content stream. For example, $L_0$ represents the beginning of the source content stream. $L_4$ may represent, for example, the end of the first second of the content stream. Each depicted frame may have an associated program time value, indicating when the frame appears in the playback of the encoded video. Brackets 300-301, 310-311, 320-321, 330-331, and 340-341 each identify an independently specified portion of the stream. In this example, the independently specified portions are groups of pictures that do not require accessing frames outside of the group when being decoded. Thus, at least locations $L_1$-$L_4$ are switching points of the type discussed in the previous paragraph for switches between streams 120 and 121. An adaptive video stream, such a stream 180 of FIG. 1, may include independently specified portions from each transcoded stream. For example, stream 180 may include portions 300, 310, 321, 331, and 340 of FIG. 3, where at time $L_2$ the decoder is able to switch from stream 120 to stream 121 seamlessly.

As seen by frame 350, independently specified portions of a video stream may contain i-frames at locations after the first frame. This does not affect the ability to switch between streams at locations $L_1$-$L_4$.

Stream 399 has also been included in FIG. 3. The i-frames of stream 399 are not aligned with streams 120 or 121. If one were to try to switch from stream 121 to stream 399, retransmission of information about an earlier location in the content stream may be required. For example, if one wished to switch from stream 121 to stream 399 at location $L_3$, portions 301, 311, and 321 of stream 121 would first be transmitted. The frame of stream 399 that immediately follows location $L_3$ is a p-frame. P-frames do not specify images independently, but instead indicate changes from the image of one or more previous frames. Thus, those previous frames of stream 399 must also be transmitted in order to decode the P-frame that occurs immediately after location $L_3$. This would be inefficient because the one or more previous frames of stream 399 need not be played. The previous frames would be transmitted only to allow a later frame to be decoded.

Dividing content streams into independently specified portions has been described with reference to video streams that use i-, b-, and p-frames. The same principle applies to other streams, including non-video streams. Regardless of the type of content being encoded in the stream, independently specified portions of different transcoded streams may be mixed together. Such mixing does not require re-transmission of data from earlier or later locations in the content if the independently specified portions of the transcoded streams are aligned.

One way of achieving alignment across the various transcoded streams is setting a common, constant size for the independently specified portions of each transcoded stream. For instance, i-frames of each transcoded video stream may occur at a constant interval, as in the example of streams 120 and 121 in FIG. 3. FIG. 3 is only an example. Longer or shorter intervals may also be used. For example, i-frames of each transcoded video stream may occur once every 2 seconds, which corresponds to every 48 frames in some video formats. Alternatively, an external source may specify when independently specified portions of the transcoded streams are to begin or end. For example, a clock or other signal source may send indications to each transcoder for when one or more independently specified portions are to begin. Although the independently specified portions may be of a constant size, the size of the independently specified portions may vary over time.

The signal source that determines when the transcoders will begin each independently specified portion of the transcoded streams may be or include the source stream that is being transcoded. For example, the source stream may include SCTE-35 (Society of Cable Telecommunications Engineers, Standard No. 35), signals time codes embedded in audio signals, or other signals that are used to determine the location of the independently specified portions.

Assuming source stream 101 is in a format that uses i-frames, the transcoders may begin the independently specified portions of the transcoded streams at the locations of some or all of the i-frames of source stream 101. For example, the transcoder may begin independently specified portions of the transcoded streams at the same locations as the i-frames of source stream 101 that begin independently specified portions. This results in the independently specified portions of the transcoded streams aligning with the independently specified portions of source stream 101. In this example, source stream 101 may be input into (and optionally output from) delay adjuster 130 along with the transcoded streams. An additional advantage of aligning the i-frames of the transcoded streams with the i-frames of the source stream is a likely increase in image quality.

The locations of the independently specified portions of the transcoded streams may be determined using a combination of inputs. For example, each independently specified portion may begin at the location of the first i-frame of source stream 101 that follows a signal, such as a clock signal or SCTE-35 signal. Similarly, each independently specified portion may begin at the location of the first i-frame of source stream 101 that occurs after a preset interval, such as, for example, every two seconds.

One of the advantages of the systems and methods disclosed herein is that a single source stream may be transcoded by multiple transcoders. Further, each transcoder may employ a different encoding algorithm and/or be supplied by a different vendor. This allows resources to be used efficiently.

Using FIG. 1 as an example, transcoder 110 may be a video encoder that excels at producing high-quality transcoded streams. For example, transcoder 110 may use a more sophisticated dual-pass video encoding algorithm that makes extensive use of the more advanced features of the video encoding standard being used. Transcoder 111, on the other hand, may be a video encoder that produces higher-bandwidth streams at noticeably lower quality than transcoder 110, but nonetheless produces lower-bandwidth streams at similar quality to transcoder 110. By allowing transcoder 111 to produce the lower-bandwidth streams, for which it may have a cost advantage, transcoder 110 can remain dedicated to encoding the higher-bandwidth streams for which it has a quality advantage. This division between encoders may be efficient even if transcoder 111 cannot produce lower-bandwidth streams with similar quality to transcoder 110. For example, in some embodiments network congestion may be rare and the highest bitrate streams may be used most of the time. In such embodiments, using the higher-quality transcoder for the highest bitrate streams will maximize quality most of the time.

In environments where multiple source streams are transcoded for adaptive streaming simultaneously, each transcoder may transcode multiple source streams simultaneously. For example, transcoder 110 may produce 10 Mbps and 5 Mbps streams for not only source stream 101 but also one or more additional source streams. Similarly, transcoder 111 may produce 2.5 Mbps and 1.2 Mbps streams for source stream 101 as well as for one or more additional source streams. As this example illustrates, the system of FIG. 1 allows for efficient use of existing transcoders.

Capacity can also be increased by adding additional transcoders. Because the transcoded streams do not need to be synchronized when output from the transcoders, any additional transcoders do not need to have similar timing characteristics to any of the existing transcoders.

The mapping of source streams to transcoders may be configured not only for maximum efficiency, but also for reliability. For example, ensuring that each source stream is transcoded by more than one transcoder allows the system to continue to operate even if one transcoder fails. The number of bitrates available for use in adaptive streaming may be reduced by the failure of a transcoder, but the ability to deliver the content to a receiver would not be eliminated unless the only streams capable of being delivered to a receiver were produced by the failed transcoder. This possibility can be reduced by spreading the production of low bitrate streams across multiple transcoders. Further, in the event of a failure of one transcoder, other transcoders may produce additional transcoded streams or produce transcoded streams at a different bitrate.

Figure 4:
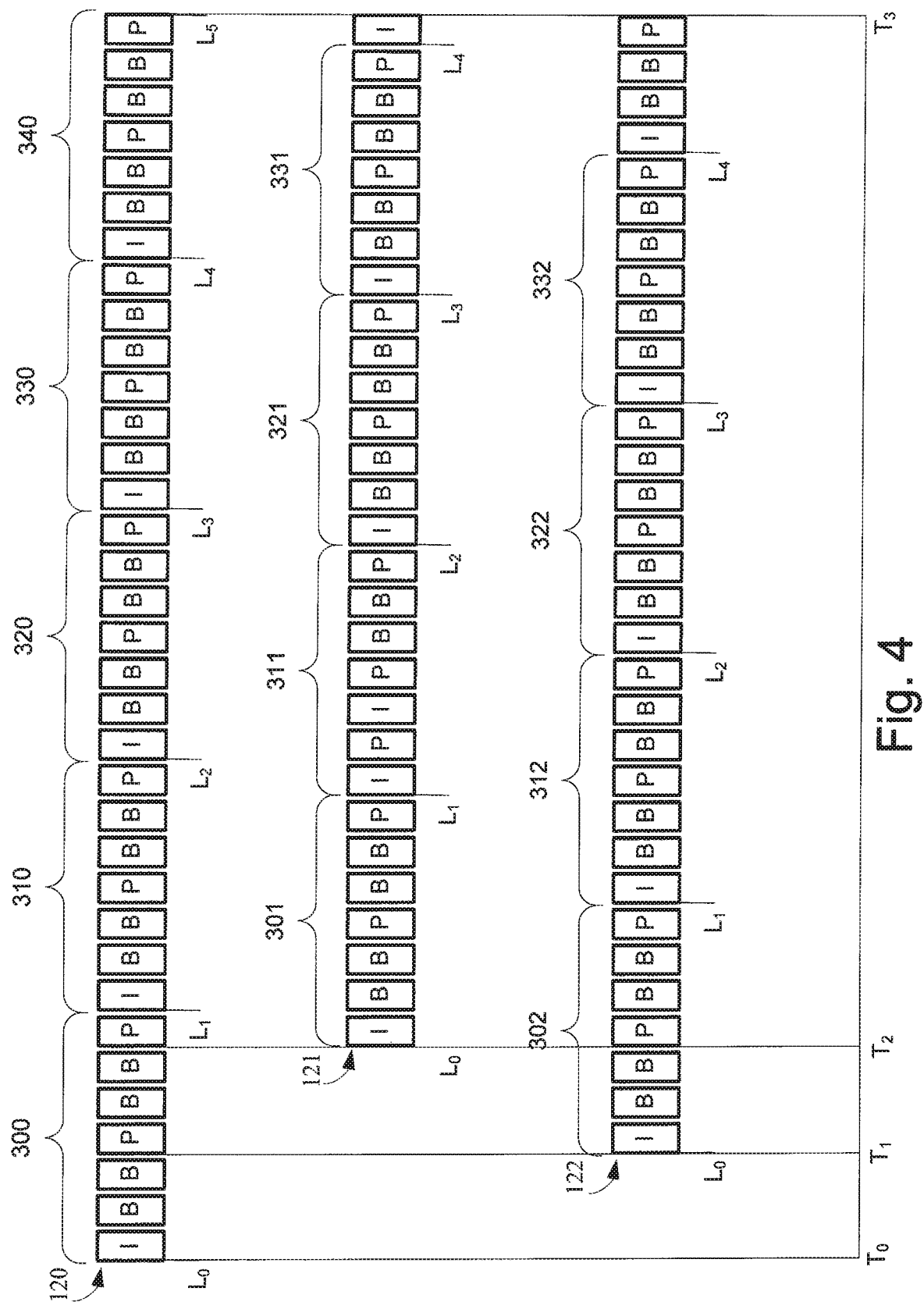
FIG. 4 illustrates an example timing of streams that may be output from one or more transcoders.

FIG. 4 illustrates a possible timing of the streams output from one or more transcoders, such as transcoders 110 and 111 of FIG. 1. As discussed above with reference to FIG. 3, the locations of the independently specified portions of the streams are aligned. The independently specified portions of the streams are identified by brackets 300-302, 310-312, 320-322, etc. In FIG. 4 the time at which the streams are output from the transcoders is also illustrated. As seen in FIG. 4, stream 120 is output first, with location $L_0$ occurring at time $T_0$. Stream 122 is output second, with location $L_0$ occurring at time $T_1$. Stream 121 is output third, with location $L_0$ occurring at time $T_2$.

Figure 5:
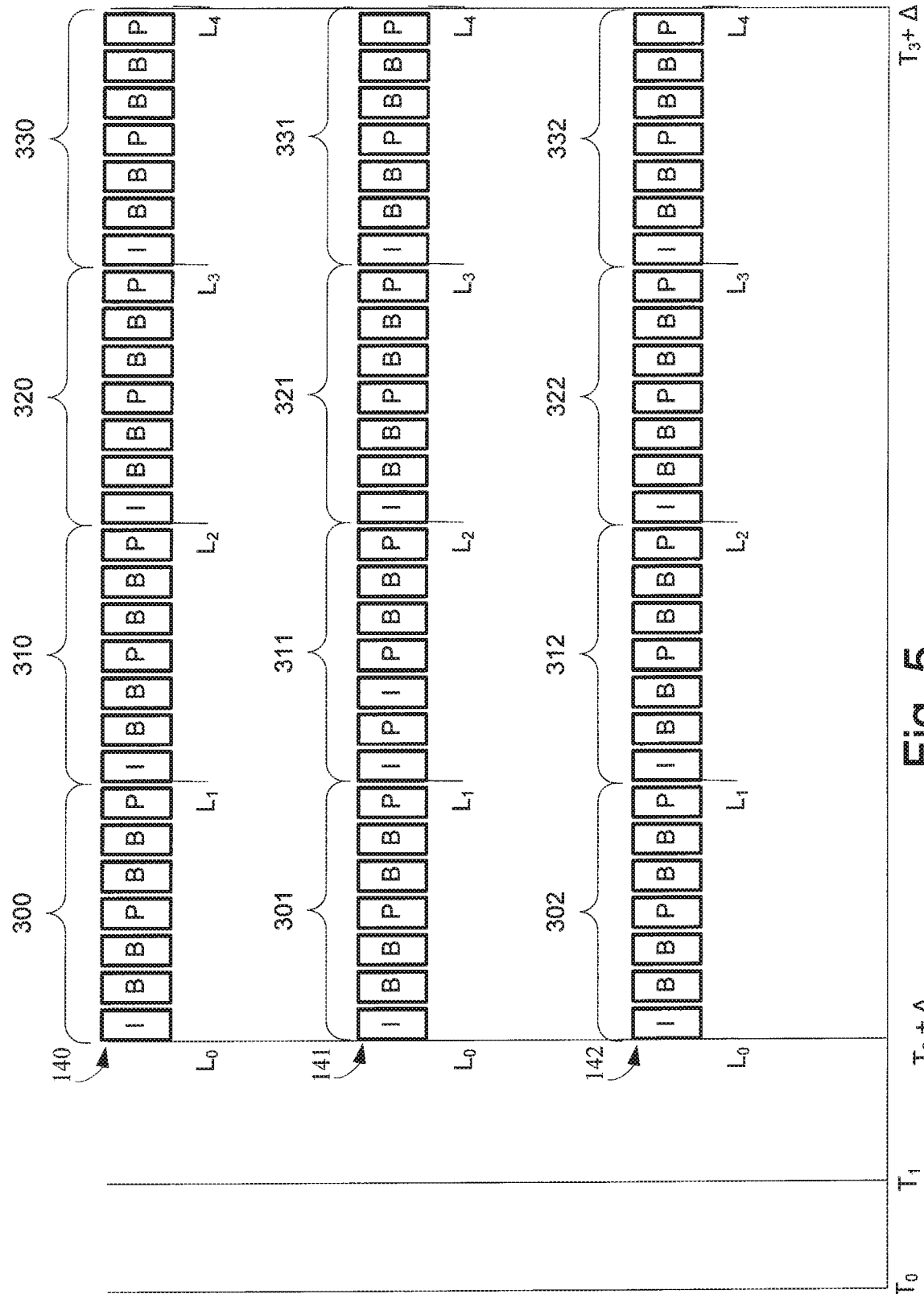
FIG. 5 illustrates an example output of a delay adjusting device.

A computing device such as the delay adjuster 130 synchronizes streams 120-122. A possible output of delay adjuster 130 is shown in FIG. 5. In the example of FIG. 5, stream 120-122 have been delayed. The result is streams 140-142, which are identical to streams 120-122 except for the shift in time illustrated in FIG. 5. Notice in FIG. 5 that each stream is delayed to begin at time $T_2+\Delta$. $\Delta$ may be zero. Alternatively, $\Delta$ may represent a processing time required by delay adjuster 130. Alternatively, $\Delta$ may represent an additional amount of delay beyond the bare minimum required to synchronize the streams.

Setting $\Delta$ to an amount beyond the bare minimum allows for variations in the timing of the output streams. For example, some transcoders may output transcoded streams sporadically rather than at a constant rate. If this is the case, the amount of delay added to the stream by delay adjuster 130 may change with time. Having an additional delay (represented by $\Delta$) built into the system may allow for any bursts of output to be smoothed by delay adjuster 130. Additionally, one may wish to add a new transcoder without interrupting any of the existing streams, but a new transcoder may have a longer processing time than the existing transcoders. Having an additional delay built into delay adjuster 130 allows for a slower transcoder to be added without affecting the timing of the streams output from delay adjuster 130.

Figure 6:
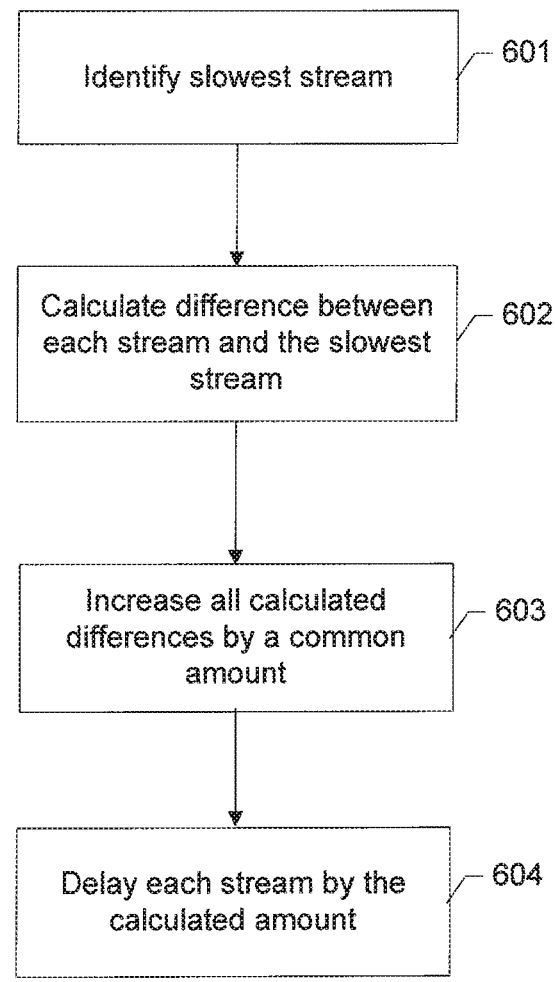
FIG. 6 illustrates a process for synchronizing streams.

FIG. 6 illustrates a process by which a device such as the delay adjuster 130 may synchronize the streams it receives. In step 601 the slowest (e.g., most delayed) stream is identified. This may occur in a number of different ways. In some systems the transcoders themselves may indicate the amount of delay that exists between each transcoded stream and the source stream. In this example, the slowest stream may be identified by the stream whose delay is the longest.

In other systems, signals that are included within each stream may be used to identify a common location in each stream. For example, each stream may include a clock signal and/or an SCTE-35 signal. Other examples of signals include labels, such as numbers, that are applied to portions of each stream. For example, each independently specified portion of a stream may be numbered. Each of these signals may have been included in source stream 101 or they may have been added to the transcoded streams by the transcoders. In either case, the stream in which an instance of these signals occurs last is the slowest stream.

If a signal from within or associated with the transcoded streams is unavailable, then the features of the transcoded streams themselves may be used to identify common locations in each stream. For example, the location of i-frames that begin independently specified portions of a video stream may be located. The stream in which the common location occurs last is the slowest stream.

In step 602, the difference in delay between each stream and the slowest stream is identified. This difference represents the amount of time that each stream needs to be delayed in order to synchronize with the slowest stream. (For the slowest stream, the difference is zero.) Where numeric delays are received from the transcoders, the delay between a stream and the slowest stream can be calculated by subtracting the delay for the stream from the delay for the slowest stream. Where numeric delays have not been received, the delay for a stream can be calculated by measuring the time difference between when a common point, such as an i-frame or a signal, is received and when the same point is received in the slowest stream.

In step 603, the delays calculated in the previous step may be increased by an amount that is the same for each stream. This step is not required, but adding this additional delay may be advantageous in some systems. This delay is represented in FIG. 5 by the symbol $\Delta$, and some of the reasons for including this delay are discussed above with reference to FIG. 5.

In step 604, each stream is delayed by the calculated amount. With the streams now synchronized, they may be forwarded to fragmenter 150.

An alternative process by which a device such as the delay adjuster 130 may synchronize the transcoded streams is to delay each transcoded stream by a preset amount of time relative to a reference stream. The reference stream may be a transcoding of the source stream, such as the transcoding for which each common location arrives first. The reference stream may also be the source stream itself. For example, each transcoded stream may be delayed such that each location in the transcoded stream is output one second after the same location in the reference stream.

Using the source stream as a reference stream is more likely in embodiments where the delay adjuster is combined with the transcoder. However, the source stream may be used as a reference by a delay adjuster that is a physically or logically separate component from the transcoder(s), so long as the delay adjuster receives the source stream or an indication of when the relevant locations in the source stream occur. Where the source stream is used as a reference, the delay adjuster may synchronize the source stream and output the source stream along with the transcoded streams.

Fragmenter 150 may package each stream into a series of fragments that are appropriate for use in adaptive streaming playback. To avoid the need to include potentially duplicative information in a fragment, as described above with reference to FIG. 3, each fragment may consist of one or more independently specified portions of a stream. For example, as seen in FIG. 5, the frames indicated by bracket 300 in FIG. 5 may make up one fragment; the frames indicated by bracket 310 may make up another fragment; etc. Alternatively, each fragment may consist of larger portions of the stream. For example, the frames identified by brackets 300 and 310 may make up one fragment, and the frames identified by brackets 320 and 330 may make up another fragment.

When the streams received by fragmenter 150 are synchronized, as described above with respect to delay adjuster 130, for example, fragmenter 150 may be able to fragment the synchronized streams in parallel instead of examining each stream individually to locate the beginning and end of the independently specified portions of each stream. For example, the fragmenter may create fragments without examining the contents of the streams it receives. Instead, the delay adjuster or another source may indicate to the fragmenter when each independently specified portion of the input streams begin. The fragmenter may use this indication from the delay adjuster or other source to begin and end each fragment. By using the indication to begin and end each fragment, the fragmenter is able to produce fragments without examining a stream to locate the independently specified portions of the stream. A signal indicating when each independently specified portion begins may be a message transmitted to the fragmenter independently of the content streams. Alternatively, the signal indicating when independently specified portions begin may be a clock signal, an SCTE35 signal, or another signal contained in one or more of the content streams. Further, the signal may have been added by the transcoders and/or delay adjuster, or the signal may have been present in the source stream.

Because the independently specified portions of the streams are synchronized and aligned, as described above, a single signal can be used for all of the streams that correspond to each source stream. Further, if the streams that correspond to more than one source stream are synchronized and aligned with one another, then a single signal may be used for the streams, notwithstanding that the streams do not correspond to a single source stream.

Where the streams have independently specified portions that are of constant duration (e.g. each independently specified portion takes the same amount of time during playback, such as two seconds), a signal may not be needed to begin and end each fragment. Instead, the fragmenter may create a fragment for each stream at a present interval that matches the duration of the independently specified portions of the input streams. Accuracy of the fragmenter's clock may be ensured using technologies such as network time protocol or GPS signals.

In addition to the aspects above, a device such as the fragmenter 150 may also examine the input streams and determine where the independently specified portions begin. Fragmenter 150 may do this by, for example, by locating the i-frames that begin the independently specified portions.

Once the location of a fragment of a stream has been identified, as discussed above, the fragmenter may then package the fragment into a deliverable format, such as an IP packet or a group of IP packets. Each IP packet or group of IP packets may contain, for example, an independently specified portion of a video elementary stream (e.g. a portion of stream 140). Additional information may also be included, such as timing and/or sequencing information that corresponds to the independently specified portion of the video elementary stream. Alternatively, the fragmenter may package fragments by indexing their locations. Examples of how the locations of fragments may be indexed include storing pointers or other indications of the location where each fragment can be found, storing a stream such that a formula may be used to locate the beginning of each fragment (such as a formula that multiplies time in the program by the stream's bitrate), entering fragments into a database, etc. The indexed fragments may then be retrieved and formatted into a deliverable format at a later time. This retrieval may be performed, for example, by server 170.

Because the input streams are synchronized, the fragmenter may determine where the independently specified portions begin for one stream and use that information to package the other streams that correspond to the same source stream without examining the other streams. Additionally, where the independently specified portions are of a constant size, the fragmenter may determine where an independently specified portion of a stream begins by examining the stream, but may rely on the passage of time to determine where the subsequent independently specified portions of the stream begin.

In systems where there are multiple source streams, such in a television environment where there are multiple channels, the transcoded streams that correspond to two or more of the source streams may be aligned and synchronized with one another. For example, transcoded video streams that correspond to two or more source streams may all have i-frames that begin independently specified portions every two seconds. In such a system, the fragmenter may apply the concepts described above to fragment these groups of streams that may correspond to more than one source stream. By fragmenting larger groups of streams using the techniques described above, the fragmenting process can be made even more efficient.

Delay adjusters and fragmenters may be separate or they may be physically and/or logically combined. Although only one delay adjuster and fragmenter are illustrated in FIG. 1, there may be more than one transcoder, delay adjuster, and/or fragmenter per source stream. Similarly, transcoders, delay adjusters, and/or fragmenters may handle multiple source streams.

Both delay adjusters and fragmenters may be physically and/or logically combined with transcoders. However, separating these components may allow for increased modularity, scalability, and efficiency. By having a separate delay adjuster and fragmenter, these components do not need to be duplicated across several transcoders. Separating the hardware of the delay adjusters and/or fragmenters from the hardware of the transcoders may improve not only modularity but also efficiency because the number of transcoders needed may differ from the number of delay adjusters and/or fragmenters needed. This separation of hardware may also make adding capacity, including redundant capacity, easier. For example, additional transcoders can be added without adding additional fragmenters. Also, fail-safe modes of operation can be provided by transcoding streams of the same content on different transcoders, as mentioned above. Further, separating transcoders from fragmenters may facilitate using the output of transcoders for additional services in addition to the adaptive streaming services because the transcoder's output is not already packaged into fragments.

Where delay adjusters are incorporated into transcoders either physically or logically, the transcoders may communicate with one another in order for the slowest stream (and therefore the total amount of delay needed) to be identified. Alternatively, as discussed above, a present amount of delay relative to the source stream may be used to synchronize the output streams.

Similar to the discussion above, there may be several servers even though only one server (170) is illustrated in FIG. 1. The functions of server 170 and fragmenter 150 may be combined into a single device, and more than one of such device may exist in some embodiments.

Figure 7:
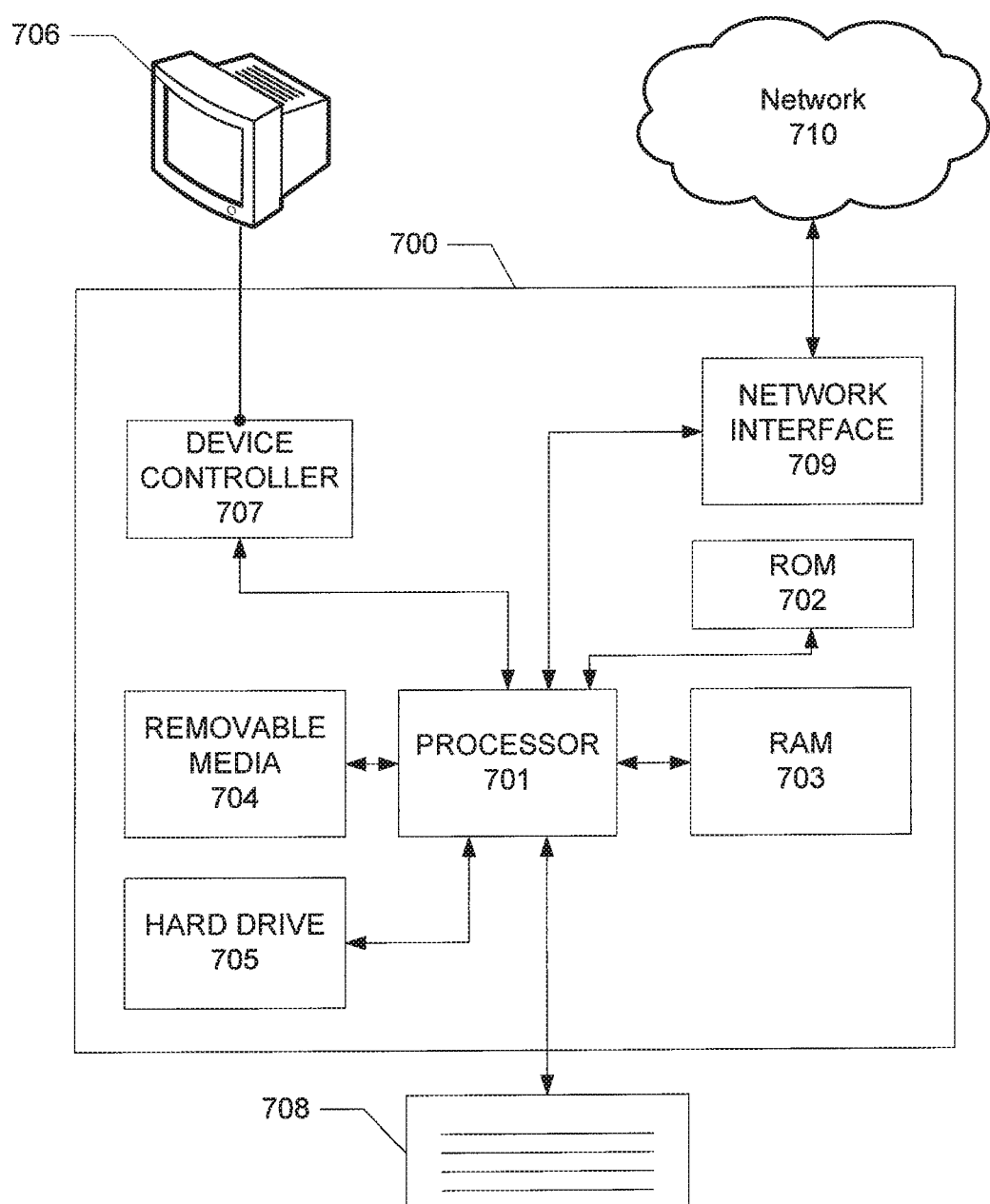
FIG. 7 illustrates an example computing device on which various methods and devices of the disclosure may be implemented.

FIG. 7 illustrates an example of general hardware and software elements that may be used to implement any of the various computing devices discussed above, such as transcoders 110 and 111, delay adjuster 130, fragmenter 150, server 170, and receivers 190 and 191. The computing device 700 may include one or more processors 701, which may execute instructions of a computer program to perform any of the features described herein. The instructions may be stored in any type of computer-readable medium or memory, to configure the operation of the processor 701. For example, instructions may be stored in a read-only memory (ROM) 702, random access memory (RAM) 703, removable media 704, such as a Universal Serial Bus (USB) drive, compact disk (CD) or digital versatile disk (DVD), floppy disk drive, or any other desired electronic storage medium. Instructions may also be stored in an attached (or internal) hard drive 705. The computing device 700 may include one or more output devices, such as a display 706 (or an external television), and may include one or more output device controllers 707, such as a video processor. There may also be one or more user input devices 708, such as a remote control, keyboard, mouse, touch screen, microphone, etc. The computing device 700 may also include one or more network interfaces, such as input/output circuits 709 (such as a network card) to communicate with an external network 710. The network interface may be a wired interface, wireless interface, or a combination of the two. In some embodiments, the interface 709 may include a modem (e.g., a cable modem). Network 710 may include communication lines such as optical cables, coaxial cables, Ethernet cables, satellite or other wireless links (including cellular links), etc. Computing device 700 may connect to a plurality of networks simultaneously. Network Interfaces 709 may have dedicated hardware for each network, or some or all of the hardware may serve multiple networks simultaneously.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
receiving, by a computing device, a video stream and a control signal, the control signal indicating a plurality of frame positions in the video stream;
determining, based on the control signal, a position of a first frame, in the video stream, that is to be encoded as an intra-coded frame;
determining a first set of frames in the video stream, the first set of frames beginning with the first frame;
encoding the first set of frames to generate a first encoded video at a first bit rate; and
encoding the first set of frames to generate a second encoded video at a second bit rate, wherein:
a first plurality of intra-coded frames in the first encoded video is aligned with a corresponding first plurality of intra-coded frames in the second encoded video, and
at least one intra-coded frame in the first encoded video is aligned with a corresponding non-intra-coded frame in the second encoded video.

2. The method of claim 1, further comprising determining additional sets of frames in the video stream, each set of frames of the additional sets of frames beginning with a different frame in the video stream that is to be encoded as an intra-coded frame.

3. The method of claim 2, wherein each set of frames of the additional sets of frames comprises a same number of frames.

4. The method of claim 2, wherein each set of frames of the additional sets of frames comprises a different number of frames.

5. The method of claim 2, further comprising:
encoding, using the first bit rate, each set of frames of the additional sets of frames to generate the first encoded video; and
encoding, using the second bit rate, each set of frames of the additional sets of frames to generate the second encoded video.

6. The method of claim 2, wherein each set of frames of the additional sets of frames begins at a location of a first frame of the video stream that occurs after a preset interval.

7. The method of claim 2, further comprising:
fragmenting the first encoded video into one or more fragments, wherein each fragment begins at a first frame of the additional sets of frames.

8. The method of claim 1, wherein the video stream comprises a first plurality of intra-coded frames, and the first encoded video comprises a subset of the first plurality of intra-coded frames.

9. An apparatus comprising:
one or more processors; and
memory storing instructions that, when executed by one or more processors, cause the one or more processors to:
receive a video stream and a control signal, the control signal indicating a plurality of frame positions in the video stream;
determine, based on the control signal, a position of a first frame in the video stream that is to be encoded as an intra-coded frame;
determine a first set of frames in the video stream, the first set of frames beginning with the first frame;

encode the first set of frames to generate a first encoded video at a first bit rate; and encode the first set of frames to generate a second encoded video at a second bit rate, wherein:
- a first plurality of intra-coded frames in the first encoded video is aligned with a corresponding first plurality of intra-coded frames in the second encoded video, and
- at least one intra-coded frame in the first encoded video is aligned with a corresponding non-intra-coded frame in the second encoded video.

10. The apparatus of claim 9, wherein the video stream comprises a first plurality of intra-coded frames, and the first encoded video comprises a subset of the first plurality of intra-coded frames.

11. The apparatus of claim 10, the memory further storing instructions that, when executed by the one or more processors, cause the one or more processors to determine, based on the control signal, additional sets of frames in the video stream, each set of frames of the additional sets of frames beginning with a different frame in the video stream that is to be encoded as an intra-coded frame.

12. The apparatus of claim 11, wherein each set of frames of the additional sets of frames comprises a same number of frames.

13. The apparatus of claim 11, wherein each set of frames of the additional sets of frames comprises a different number of frames.

14. The apparatus of claim 12, the memory further storing instructions that, when executed by the one or more processors, cause the one or more processors to:
encode each set of frames of the additional sets of frames to generate the first encoded video using the first bit rate; and
encode each set of frames of the additional sets of frames to generate the second encoded video using the second bit rate.

15. The apparatus of claim 11, wherein each set of frames of the additional sets of frames begins at a location of a first frame of the video stream that occurs after a preset interval.

16. A method comprising:
receiving a video and a control signal, the control signal indicating a plurality of frame positions in the video;
determining, based on the control signal, a set of frames in the video to be encoded at different bitrates;
encoding, using a first bit rate, the set of frames to generate a first encoded video stream; and
encoding, using a second bit rate, the set of frames to generate a second encoded video stream,
wherein the first encoded video stream and the second encoded video stream comprise a plurality of aligned intra-coded frames, and
wherein the second encoded video stream comprises a different quantity of intra-coded frames than the first encoded video stream.

17. The method of claim 16, wherein each set of frames of a plurality of sets of frames in the video comprises a same number of frames.

18. The method of claim 16, wherein each set of frames of a plurality of sets of frames in the video comprises a different number of frames.

19. The method of claim 17, wherein a first set of frames of the plurality of sets of frames comprises multiple intra-coded frames.

20. The method of claim 17, wherein a first set of frames of the plurality sets of frames comprises a single intra-coded frame and one or more predictive-coded frames.

* * * * *

UNITED STATES PATENT AND TRADEMARK OFFICE
CERTIFICATE OF CORRECTION

PATENT NO. : 10,652,562 B2
APPLICATION NO. : 15/713150
DATED : May 12, 2020
INVENTOR(S) : Syed et al.

It is certified that error appears in the above-identified patent and that said Letters Patent is hereby corrected as shown below:

On the Title Page

Column 1, Related U.S. Application Data, Line 1:
Delete "(60)" and insert --(62)-- therefor In the Specification Column 4, Detailed Description, Line 61:
Delete "Mpbs" and insert --Mbps-- therefor Column 10, Detailed Description, Line 18:
Delete "A," and insert --$\Delta$,-- therefor Signed and Sealed this
Twentieth Day of December, 2022

Katherine Kelly Vidal
*Director of the United States Patent and Trademark Office*